INVENTOR
Vincent A. Butler.

BY
Mason, Porter, Diller & Stewart
ATTORNEYS

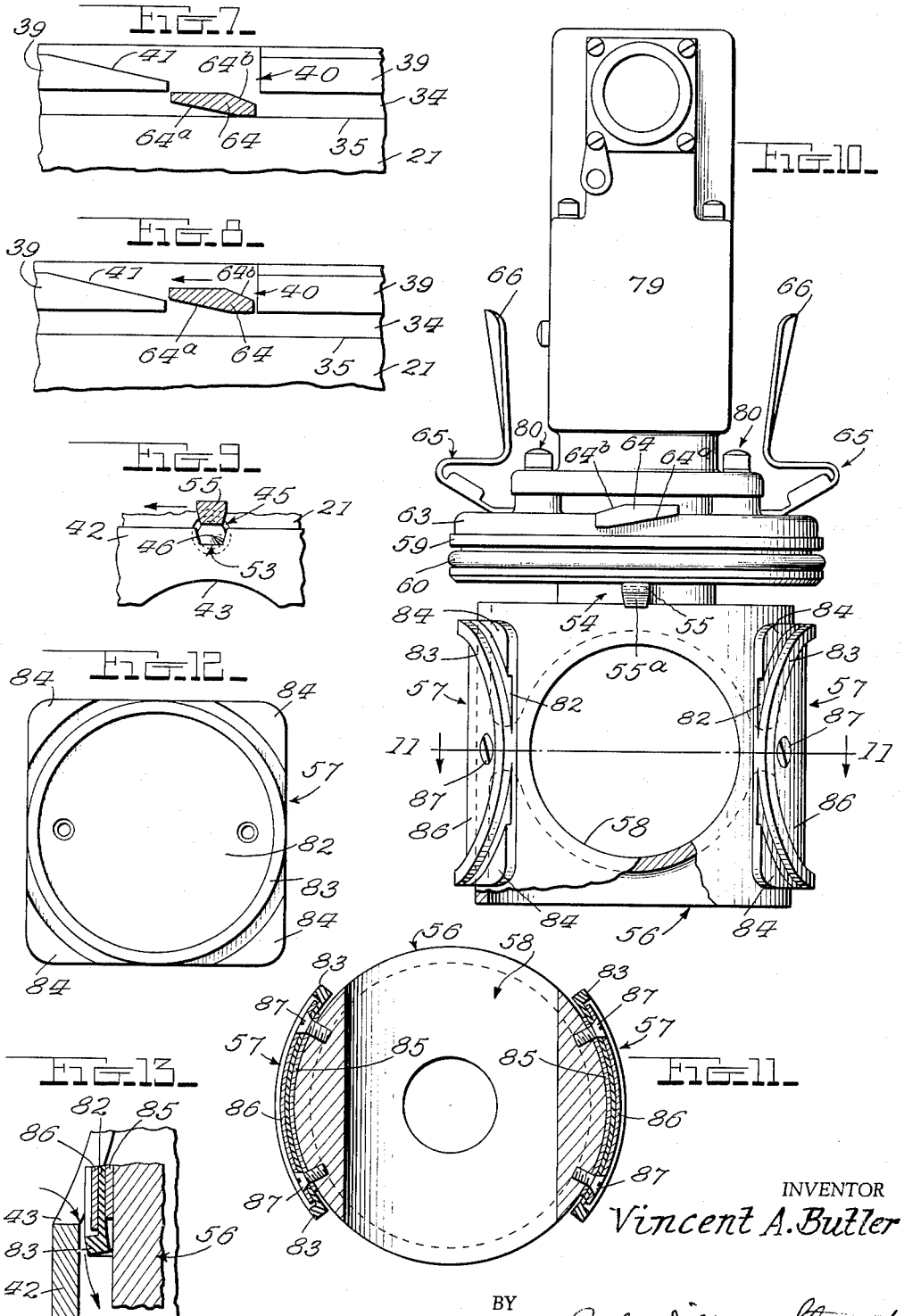

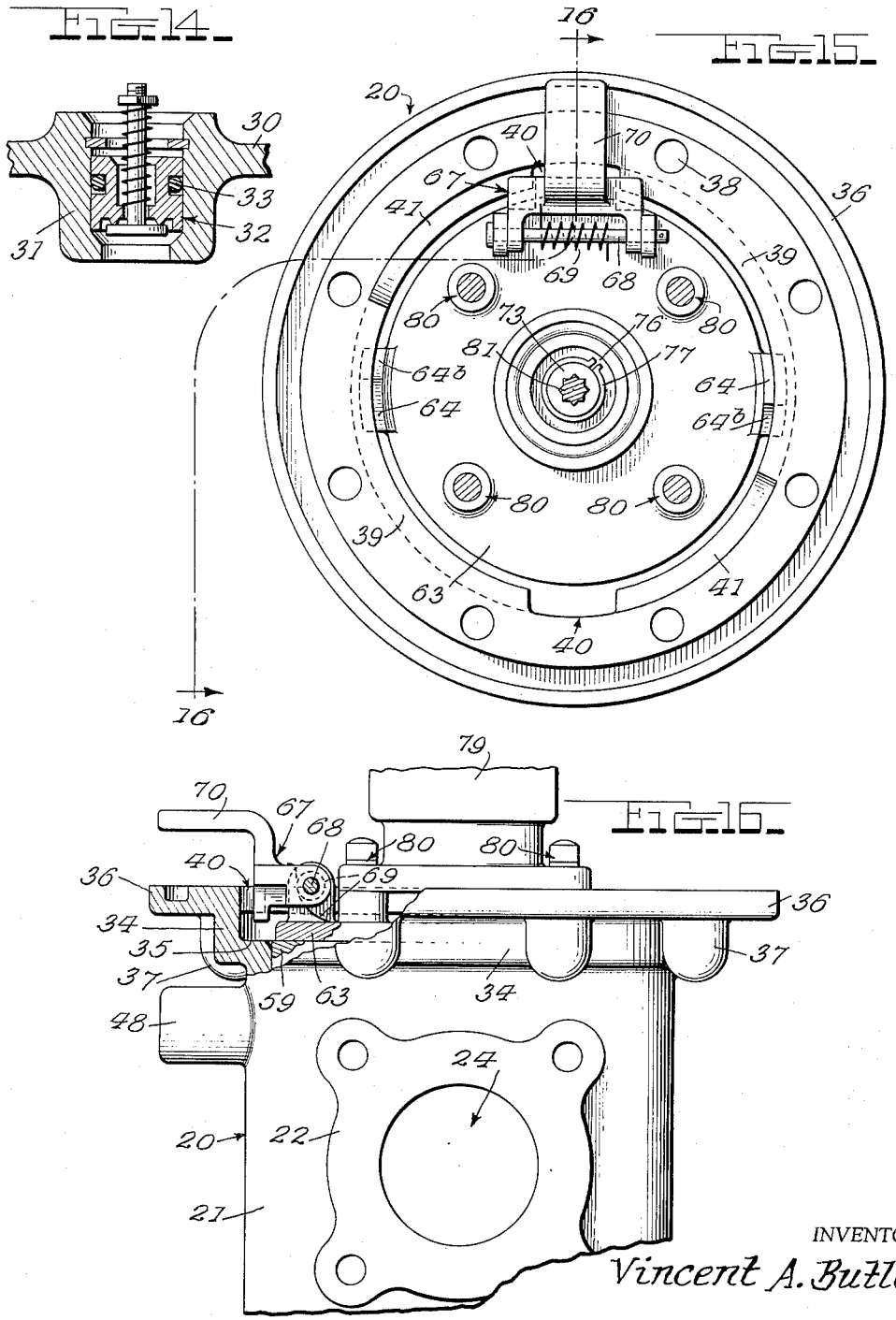

3,202,166
SHUT-OFF VALVE ASSEMBLY HAVING A REMOVABLE PLUG
Vincent A. Butler, Los Angeles, Calif., assignor to Parker-Hannifin Corporation, Cleveland, Ohio, a corporation of Ohio
Filed May 29, 1959, Ser. No. 816,808
14 Claims. (Cl. 137—115)

This invention relates to a new and improved shut-off valve assembly intended primarily for aircraft fuel lines but not restricted to this particular field of use. Ordinarily, when installing such a valve assembly, two additional cut-off valves are installed in the line, one at the upstream side of said assembly and one at the downstream side thereof, said additional cut-off valves being used to prevent flow through the line when said assembly requires removal of elements for servicing, such as installing new seals. The present invention however, has aimed to provide a novel assembly making possible the elimination of the two additional cut-off valves by providing adequate auxiliary cut-off means embodied in said assembly.

Another object has been to provide a novel assembly in which a manually movable element must be moved to a predetermined position to permit withdrawal of valve parts from the casing, and in which an operating connection is provided from said movable member to the auxiliary cut-off means, said operating connection serving to automatically close said auxiliary cut-off means when the aforesaid movable member is moved to said predetermined position, thereby overcoming the possibility of withdrawing said valve parts without first closing said auxiliary cut-off means.

A further object has been to provide a shut-off valve assembly in which a valve plug is employed between the inlet and outlet of the casing, in which said valve plug is within and coacts with a valve sleeve disposed against the inner side of the casing side wall, and in which said valve sleeve constitutes the aforesaid auxiliary cut-off means.

Another object has been to provide a novel assembly in which a turnable member which normally holds valve parts against withdrawal from a cup-like casing is disposed within the open end of said casing and is provided with projecting peripheral lugs cooperable with spaced arcuate circumferentially extending ribs on the casing side wall to secure said turnable member to said casing until it is turned to a predetermined position in which said lugs may pass through the spaces between the adjacent ends of said ribs, and in which a releasable latch on said turnable member normally abuts adjacent ends of said ribs to prohibit accidental turning of said turnable member.

A further object has been to provide an assembly of the general construction just mentioned, in which parts to be withdrawn are so connected with the aforesaid turnable member as to be unitarily withdrawable therewith, and in which the aforesaid ribs have ramps cooperable with lugs of said turnable member to aid in withdrawal upon turning of said turnable member, after shifting it outwardly to move said lugs through the spaces between the adjacent ends of said ribs.

A still further object has been to provide for turning the aforesaid valve sleeve to closed position as the aforesaid turnable member is turned to align its lugs with the spaces between the adjacent ends of the aforesaid ribs preparatory to outward shifting of said turnable member, and to provide a construction in which this shifting disengages a valve-sleeve-turning member from the valve sleeve which it has turned to closed position.

Another object has been to provide a novel assembly in which a spring-pressed detent engages the valve sleeve and holds it against accidental turning from the closed position in which it is left by withdrawal of parts from said sleeve and the casing.

Still another object has been to provide for automatic disengagement of the aforesaid detent from the valve sleeve upon re-insertion of elements.

A still further object has been to provide a novel valve assembly in which sealing means which acts upon valve closing, to cut off communication between the line and the interior of the assembly, may yield out of sealing position under the influence of excessively high fluid pressure caused by thermal expansion of fluid in the line, and to provide pressure relief means for the high-pressure fluid thus released into the assembly.

Yet another object has been to provide a novel assembly in which a single pressure relief valve will relieve the aforesaid excessively high fluid pressure whether such pressure be built up at the upstream side of the assembly, at the downstream side thereof, or at both upstream and downstream sides.

Yet another object has been to provide a novel valve assembly in which a continuous seal on one of two relatively movable valve elements, contacts slidably with the other of said two elements and surrounds a port of said other element when in valve-closed position, and in which said seal is provided with skids slidably contacting with said other element and serving to prevent said seal from catching on the edge of said port during movement to valve-closed position.

A still further object has been to provide a novel and advantageous construction for the skid-carrying seal.

With the above and other objects in view that will hereinafter appear, the nature of the invention will be more clearly understood by reference to the following detailed description, the appended claims and the several views illustrated in the accompanying drawings.

In the drawings:

FIGURE 7 is a detail section on line 7—7 of FIGURE 5, showing one of the lugs of the aforesaid turnable member in position to allow initial outward shifting of said turnable member and parts connected therewith.

FIGURE 8 is a view similar to FIGURE 7 but showing the lug in the position to which it is shifted by the aforesaid initial outward shifting of said turnable member and in readiness to coact with one of the ramps upon turning of said turnable member in the direction indicated by the arrow.

FIGURE 9 is a view similar to FIGURE 4 but showing how the initial outward shifting, just referred to, disengages the sleeve-turning member from the sleeve and allows the detent to engage said sleeve.

FIGURE 10 is a side elevation showing the turnable member and all parts unitarily connected therewith, after withdrawal.

FIGURE 11 is a horizontal sectional view on line 11—11 of FIGURE 10, showing the two seal units connected with the valve plug.

FIGURE 12 is an outer side view of one of the seal units just referred to.

FIGURE 13 is a detail vertical section showing how either seal unit may yield from operative position to release excessively high fluid pressure to the pressure relief valve.

FIGURE 14 is a detail vertical sectional view showing the pressure relief valve.

FIGURE 15 is a view similar to FIGURE 2 but showing a slightly different casing configuration, and a different form of latch for normally holding the above mentioned turnable member against turning.

FIGURE 16 is a fragmentary side elevation partly broken away and in section, substantially on line 16—16 of FIGURE 15, the latch, however, being shown in edge view for better illustration.

Figure 1:
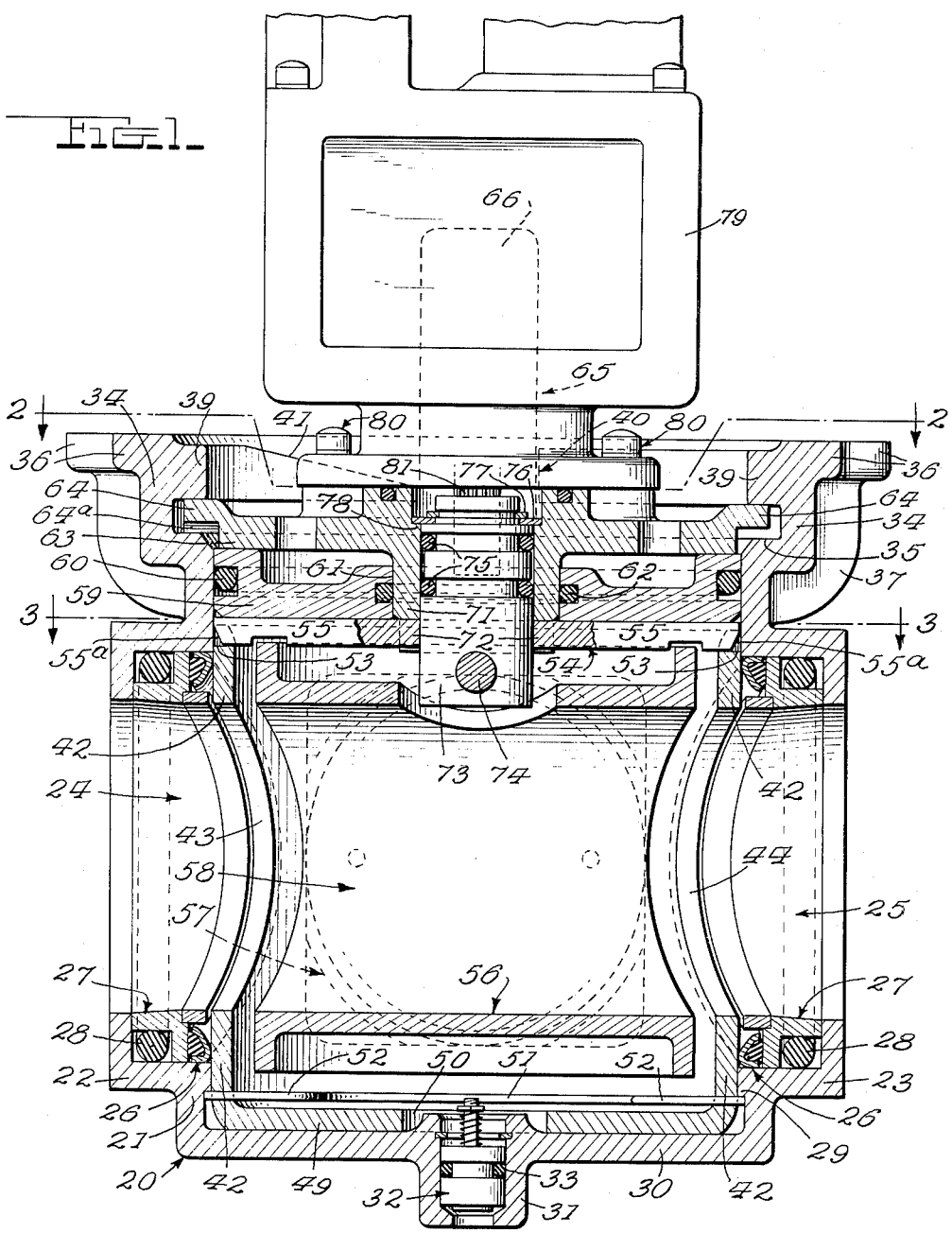
FIGURE 1 is a longitudinal sectional view of the assembly positioned with the axis of the plug disposed vertically and the plug in open position.

The construction shown in the drawings will be rather specifically described but it is to be understood that variations may well be made.

The assembly will be described in the vertical position shown in FIGURE 1 but is not restricted to this position. Therefore such terms as "upper," "lower," "bottom," etc. are to be considered as relative rather than limiting.

A cup-like casing 20 is provided (see FIGURE 1). The side wall 21 of the casing is cylindrical and formed with diametrically opposed external line-attaching bosses 22 and 23 through which passages 24 and 25 extend. Either of these passages may be the fluid inlet and the other the fluid outlet but it will be assumed that 24 is the inlet and 25 the outlet. Sealing rings 26 surround the inner ends of the passages 24 and 25 and are associated with ring assemblies 27 inserted into the bosses 22 and 23, each of said ring assemblies being provided with a peripheral O-ring seal 28.

Below the sealing rings 26, the casing side wall 21 is somewhat enlarged internally to provide a shoulder 29 facing the casing bottom 30, and this bottom has a central boss 31 in which a pressure relief valve assembly 32 is mounted, said assembly having an O-ring seal 33.

The casing side wall 21 has an outwardly offset upper end portion 34 and a continuous upwardly facing ledge 35. The offset wall portion 34 is suitably flanged at 36 to abut an appropriate support (not shown) and is provided with bosses 37 under the flange, said flanges and bosses being formed with openings 38 to receive screws for securing the casing 20 to the support.

Above and parallel with the ledge 35, the inner side of the offset casing wall portion 34 is provided with two circumferentially extending ribs 39 (see FIGURES 1, 2, 5 and 15). Each rib 39 is of somewhat less than 180° in length to leave gaps 40 between the ends of each rib and the ends of the other rib. One end portion of each of the ribs 39 is inclined at its upper side to provide said ribs with ramps 41 which incline circumferentially in the same direction from the gaps 40, respectively.

Figure 3:
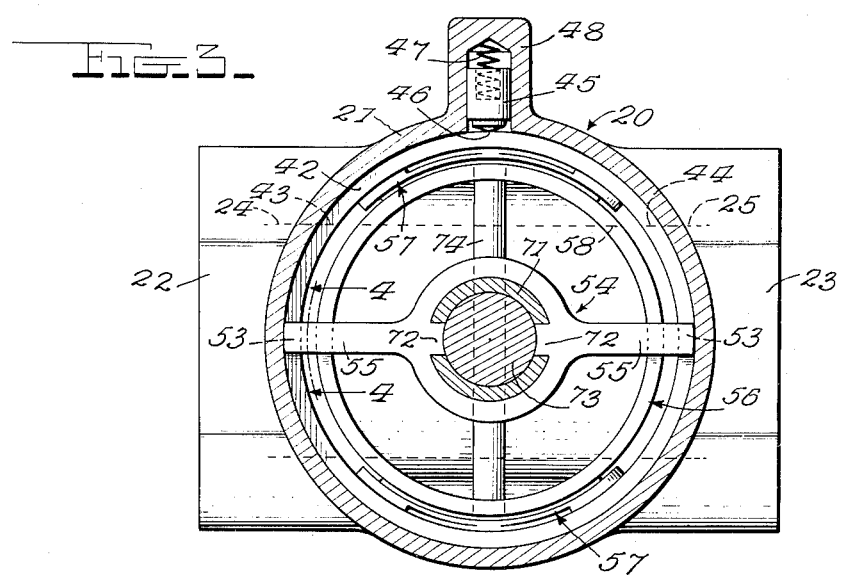
FIGURE 3 is a horizontal sectional view on line 3—3 of FIGURE 1.
Figure 6:
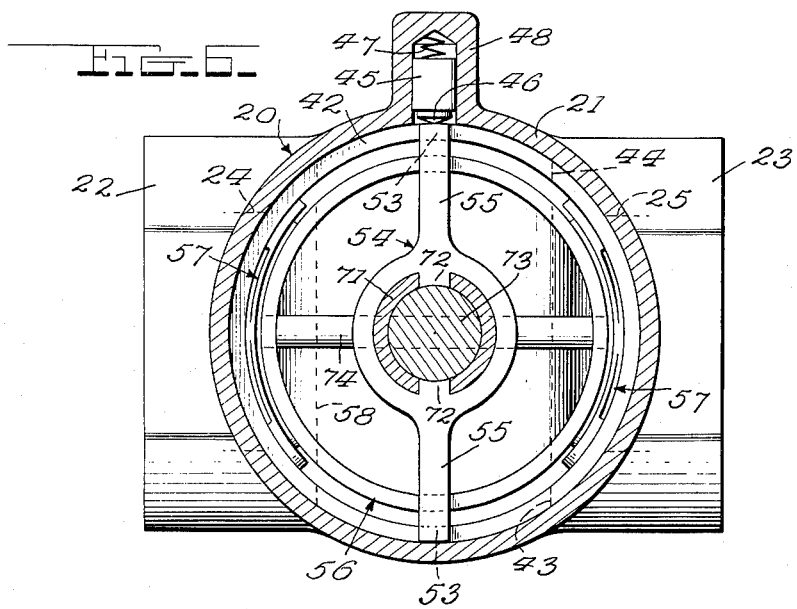
FIGURE 6 is a view similar to FIGURE 2 but showing how the sleeve turning member turns the sleeve to closed position when the aforesaid turnable member is turned to the position of FIGURE 5.

A normally non-rotatable valve sleeve 42, shown primarily in FIGURES 1, 3 and 6, is disposed against the inner side of the casing side wall 21, is provided with diametrically opposed ports 43 and 44 normally registering with the inlet and outlet passages 24 and 25, respectively, and is in sealing contact, around said ports, with the seal rings 26. The sleeve 42 is normally held against turning by the same meaens, hereinafter explained, employed to turn it to the closed position of FIGURE 6. To hold the sleeve against accidental turning from this closed position, a spring-pressed detent 45, having a conical end 46 (FIGURES 3 and 6) is provided. The detent 45 and its spring 47 are mounted in a boss 48 on the casing side wall 21.

The lower end of the sleeve 42 is closed by a bottom plate 49 resting upon the casing bottom 30 and said bottom plate has a central opening 50 permitting communication between the sleeve interior and the pressure relief valve assembly 32.

Directly above the bottom plate 49, an arcuate spring wire 51 having aligned outwardly projecting ends 52, is provided, to prevent upward shifting of the sleeve 42. The wire ends 52 extend through openings in the sleeve 42 and underlie the shoulder 29 of the casing wall 21.

The upper end of the sleeve 42 is open and is spaced downwardly from the ledge 35 of the casing side wall 21. This upper end of the sleeve 42 has two diametrically aligned upwardly open notches 53 shown in FIGURES 1, 4 and 9. Each notch is preferably widened toward its upper end.

Figure 4:
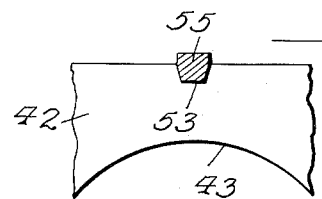
FIGURE 4 is a detail vertical section on line 4—4 of FIGURE 3 showing one of the connections between the valve sleeve and the operating member for this sleeve.

A member 54 (FIGURES 1, 3, 6 and 10) is provided for turning the sleeve 42 when required. This member 54 includes diametrically aligned arms 55 the ends of which are normally seated in the notches 53 of the sleeve 42 as seen in FIGURES 1, 3 and 4. The arm ends and notches thus coact in forming operating connections between the sleeve-turning member 54 and the sleeve 42 and said connections are separable as seen in FIGURE 9 when parts (ses FIGURE 10) are to be withdrawn from the assembly for servicing. The extremities of the arms 55 have steeply inclined cam surfaces 55$^a$ (FIGURES 1 and 10) for a purpose to be later explained.

A valve plug 56 (FIGURES 1, 3, 6, 10 and 11) is disposed within and concentric with the sleeve 42, and said plug has diametrically opposite sealing units 57 contacting with the inner side of said sleeve. When the plug passage 58 registers with the sleeve ports 43 and 44 (FIGURES 1 and 3) to permit fluid flow through the assembly, the sealing units contact with the sleeve 42 between said sleeve ports 43 and 44. When the plug 56 is turned to closed position, the sealing units 57 close the sleeve ports 43 and 44 to prohibit fluid flow through the assembly. The construction of the sealing units 57 will be later described.

A closure plate 59 (FIGURES 1 and 10) is fitted with clearance within the casing 20 directly below the ledge 35 of the casing side wall 21. This closure plate 59 carries an O-ring seal 60 contacting with the casing wall 21. The closure plate 59 rests on the sleeve-turning member 54 and has a central opening 61 surrounded by an O-ring seal 62.

Figure 5:
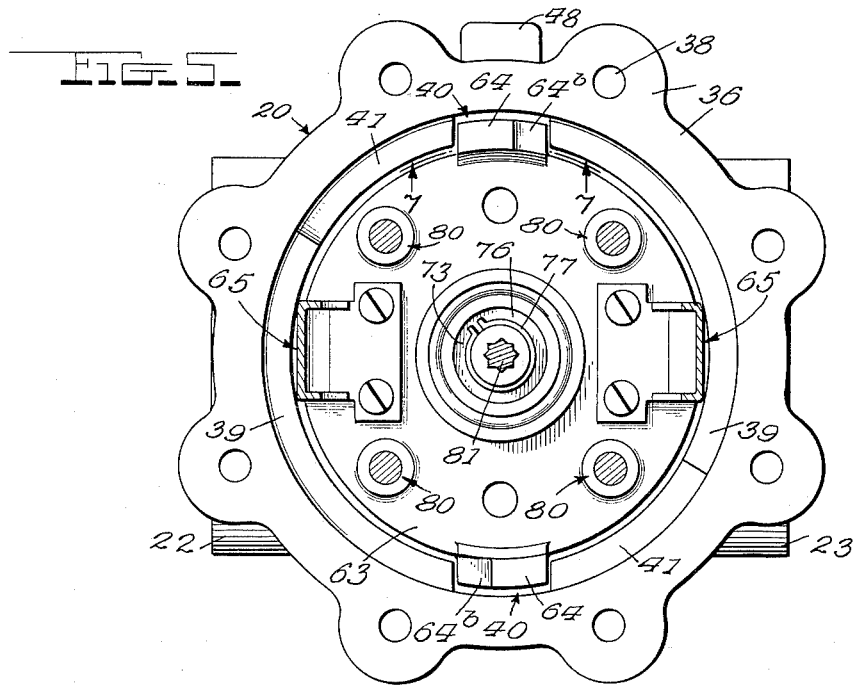
FIGURE 5 is a view similar to FIGURE 2 but showing the turnable member which normally prevents withdrawal of parts, turned to a position in which its peripheral lugs may pass outwardly through the spaces between the adjacent ends of the casing-carried ribs.

An abutment plate 63 (FIGURES 1, 2, 5, 10, 15 and 16) abuts the upper side of the closure plate 59 and has two diametrically opposed peripheral lugs 64. See the views just mentioned and FIGURES 7 and 8. The lugs 64 normally contact with the lower sides of the arcuate ribs 39, 90° from the gaps 40 and lie upon the ledge 35, as seen in FIGURES 1, 2, 15 and 16. The lugs and ribs thus hold the plug 56, the sleeve-turning member 54, the closure plate 59 and the abutment plate 63 against wthdrawal from the casing 20 and sleeve 42, until said abutment plate 63 is turned 90° to a position in which the lugs 64 are aligned with the gaps 40, as seen in FIGURE 5. Each of the lugs 64 has an inclined ramp-engaging lower surface 64$^a$ and an upwardly presented bevel 64$^b$ for purposes to appear.

A latch, or latches, is/are mounted on the abutment plate 63 and normally received in one or both of the gaps 40, to abut the adjacent ends of the ribs 39 and hold said plate 63 against turning to the position of FIGURE 5, until said latch or latches is/are released. In FIGURES 1, 2, 5 and 10, two latches are shown in the form of spring arms 65 having finger pieces 66 by means of which they may be released. In FIGURES 15 and 16, a single latch 67 is pivotally mounted at 68, is yieldably held in operative position by a spring 69, and is provided with a finger piece 70 by means of which it may be released.

The abutment plate 63 has a sleeve-like hub 71 which projects downwardly through the opening 61 of the closure plate 59 and contacts with the seal 62. The lower end of the hub 71 is keyed at 72 (FIGURES 1, 3 and 6) to the sleeve-turning member 54. Thus, when the abutment plate 63 is turned 90° to the position of FIGURE 5, the member 54 correspondingly turns the sleeve 42 to the position of FIGURE 6, in which position said sleeve closes the inlet passage 24 and the outlet passage 25.

The plug 56 has an upwardly projecting operating shaft 73 secured thereto by a diametrical pin 74. The shaft 73 extends through an opening in the sleeve-turning member 54 and into the sleeve-like hub 71, and is provided wth O-ring seals 75 engaging said hub. Upward shifting of the abutment plate 63 with respect to the shaft 73 is prevented by a washer 76 secured to said shaft 73 by means of a snap ring 77, and abutting a shoulder 78 of said plate 63. It will thus be seen that the shaft 73 acts to unitarily connect the plug 56, sleeve-turning member 54, closure plate 59, and abutment plate 63 for withdrawal as a unit (FIGURE 10) from the casing 20 and sleeve 42, after closing of this sleeve (FIGURE 6) has been effected by turning of the abutment plate 63 to the position of FIGURE 5.

A gear-reduction, electric motor 79 (FIGURES 1 and 10) is provided for turning the shaft 73 to turn the plug 56 to opened and closed positions during operation of the assembly. The motor 79 is secured at 80 upon the abutment plate 63 and acts as a hand grip when withdrawing the unit of FIGURE 10 for servicing and when re-inserting the serviced unit, as hereinafter explained. The motor shaft 81 has a splined or other suitable connection with the upper end of the plug shaft 63.

Each above-mentioned sealing unit 57 of the plug 56 is constructed as shown primarily in FIGURES 10, 11 and 12. The unit is constructed in a yieldable plastic (preferably Teflon) and includes a wafer-like four-cornered base 82 having a continuous, integral sealing rib 83 on its outer side. This rib 83 contacts slidably with the sleeve 42 and is dimensioned to surround the sleeve port 43 or 44 when the plug 56 is turned 90° from the position shown in FIGURE 1, thereby prohibiting flow through the assembly. The four corner portions 84 of the base 82 project beyond the rib 83 and are thickened to form skids 84 for sliding contact with the sleeve 42. These skids 84 and the rib 83 project the same distance from the base 82, and said skids 84 are spaced radially outward from said rib 83. During turning of the plug 56 to closed position, the rib 83 and skids 84 slide on the sleeve 42, and said skids prevent the leading portion of said rib from catching on the edge of the opening 43 or 44.

A spacing plate 85 is interposed between the base 82 and the plug 56, a washer plate 86 is disposed against the outer side of said base 82, and screws 87 extend through the three elements 82, 85 and 86 and are threaded into said plug 56.

The base 82 projects beyond the edge or edges of the spacing plate 85 as shown in FIGURES 11 and 13, thereby locating the sealing rib 83 beyond said edge or edges. Under normal conditions, when the plug 56 occupies closed position, the rib 83 remains in sealing contact with the sleeve 42. However, should thermal expansion of fluid cause excessively high pressure in the fuel line at the upstream side of the assembly, at the downstream side thereof, or at both sides, such pressure will act against one or both of the seal units 57 and will cause inward seal distortion as shown in FIGURE 13. This allows the abnormally high-pressure fluid to flow into the sleeve 42 and escape through the pressure relief valve assembly 32.

*Operation and withdrawal procedure*

Figure 2:
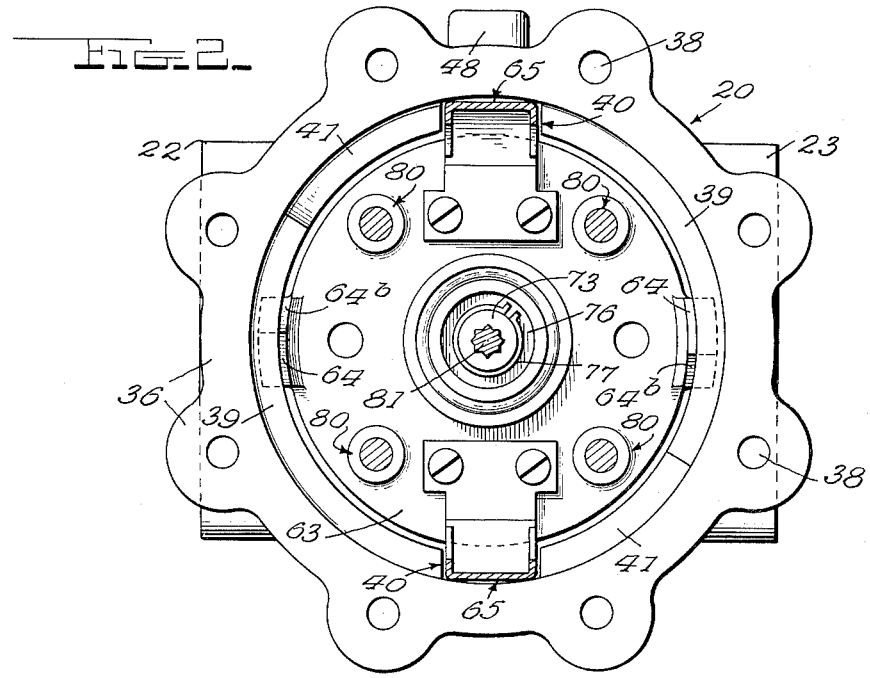
FIGURE 2 is a horizontal sectional view on line 2—2 of FIGURE 1.

With the various elements relatively positioned as in FIGURES 1, 2 and 3, flow is permitted through the assembly. To shut off the flow, the motor 79 is operated lo effect 90° turning of the plug 56 within the sleeve 42, causing the seal units 57 to close the ports 43 and 44 of said sleeve 42. After this, in case of an excessive build-up of fluid pressure due to thermal expansion, one or both of the seal units 57 may yield as in FIGURE 13 and release the abnormally high-pressure fluid to the pressure relief valve assembly 32.

When servicing of parts is required, the connected elements 56, 54, 59, 63, 73 and 79 may be readily withdrawn as a unit (FIGURE 10). To accomplish this, the latch means 65 and/or 67 are/is released and the motor 79 is gripped and turned in either direction, to turn the abutment plate 63 90° to the position of FIGURE 5. This correspondingly turns the member 54 (see FIGURE 6). This member 54, by virtue of the connections of its arms 55 with the sleeve 42, turns said sleeve 42 to close the inlet passage 24 and outlet passage 25 as seen in FIGURE 6. Turning of the abutment plate 63 as above stated, aligns the lugs 64 with the gaps 40 as seen in FIGURES 5 and 7. The entire withdrawable unit is then initially shifted upwardly by hand until the lugs 64 pass through the gaps 40 as seen in FIGURE 8. This initial shifting moves the arms 55 out of the notches 53 as shown in FIGURE 9 and the conical end 46 of the detent 45 then enters one of these notches 53 to hold the sleeve 42 against being turned accidentally from its closed position during withdrawal of the unit of FIGURE 10.

After the aforesaid initial shifting of the withdrawable unit, the motor 79 is turned to move the lugs 64 in the direction of the arrow in FIGURE 8. Consequently, the inclined surfaces 64$^a$ of these lugs ride up the ramps 41 and upwardly cam the withdrawable unit until the seal ring 60 of the cover plate 59 is released from contact with the casing wall 21, thereby breaking any suction which may prior to this have resisted all but initial withdrawal movement of said unit. This unit may then be completely withdrawn easily by hand and may be carried to a place at which it may be conveniently serviced.

*Re-insertion of withdrawn unit*

After servicing, the unit of FIGURE 10 is re-inserted by so positioning it that the lugs 64 may pass downwardly through the gaps 40, then shifting said unit downwardly, and finally turning said unit back to its original position. The downward shifting of the unit causes the cam surface 55$^a$ of one of the arms 55 to force the detent end 46 from the notch 53 into which it was previously projected, and said downward shifting also re-seats the arms 55 in the two notches 53. Therefore, as the re-inserted unit is finally turned back to its original position, the arms 55 turn the sleeve 42 to the open position of FIGURES 1 and 3. During the turning of the re-inserted unit back to its original position, the bevels 64$^b$ depress the lugs 64 onto the ledge 35 and prevent them from catching on the ends of the ribs 39.

From the foregoing, it will be seen that a novel and advantageous construction has been disclosed for attaining the desired ends. However, attention is again invited to the possibility of making variations.

I claim:
1. In a shut-off valve assembly having a valve plug axially withdrawable from a valve casing, said valve casing having a side wall concentric with said plug and formed with an inlet and an outlet; a normally non-rotatable valve sleeve interposed between said plug and said side wall, said valve sleeve having ports normally registering with said inlet and outlet respectively and controlled by said valve plug, cooperating means carried by said valve plug, said cooperating means being directly engageable and cooperable with said valve sleeve for closing said valve sleeve ports upon rotation of said valve plug relative to said valve sleeve, means for holding said valve sleeve against axial shifting, and means whereby said valve sleeve may be turned to close said inlet and outlet prior to withdrawal of said valve plug, a turnable member releasably engaged with said casing for normally holding said plug against withdrawal, said turnable member being turnable about an axis aligned with the axis of said plug to a predetermined position in which it is freed from engagement with said casing to permit plug withdrawal, said turnable member constituting an actuator for said valve-sleeve-turning means, and said valve-sleeve-turning means having a separable connection with said valve sleeve to disengage said turning means from said valve sleeve during plug withdrawal.

2. In a shut-off valve assembly having a valve plug axially withdrawable from a valve casing, said valve casing having a side wall concentric with said plug and formed with an inlet and an outlet; a normally non-rotatable valve sleeve interposed between said plug and said side wall, said valve sleeve having ports normally registering with said inlet and outlet respectively and controlled by said valve plug, cooperating means carried by said valve plug, said cooperating means being directly engageable and cooperable with said valve sleeve for closing said valve sleeve ports upon rotation of said valve plug relative to said valve sleeve, means for holding said valve sleeve against axial shifting, means whereby said valve sleeve may be turned to close said inlet and outlet prior to withdrawal of said valve plug, a turnable member releasably engaged with said casing for normally holding said plug against withdrawal, said turnable member being disposed entirely above said plug and being turnable about an axis aligned with the axis of said plug to a predetermined position in which it is freed from engagement with said casing to permit plug withdrawal, said turnable member constituting an actuator for said valve-sleeve-turning means, said valve-sleeve-turning means having a separable connection with said valve sleeve to disengage said turning means from said valve sleeve during plug withdrawal.

3. In a shut-off valve assembly having a valve plug axially withdrawable from a valve casing, said valve casing having a side wall concentric with said plug and formed with an inlet and an outlet; a normally non-rotatable valve sleeve interposed between said plug and said side wall, said valve sleeve having ports normally registering with said inlet and outlet respectively and controlled by said valve plug, cooperating means carried by said valve plug, said cooperating means being directly engageable and cooperable with said valve sleeve for closing said valve sleeve ports upon rotation of said valve plug relative to said valve sleeve, a turnable member releasably engaged with said casing for normally holding said plug against withdrawal, said turnable member being disposed entirely above said plug and being turnable about an axis of said plug to a predetermined position in which it is freed from engagement with said casing to permit simultaneous withdrawal of said turnable member and plug from said casing, and a valve-sleeve-turning element connected with said turnable member to be turned by the latter, said valve-sleeve-turning element being located axially between said turnable member and said valve sleeve and having a connection with said valve sleeve to turn said sleeve to closed position when said turnable member is turned to the aforesaid position, said connection comprising coacting portions on said valve sleeve and said valve-sleeve-turning element, said coacting portions being separable upon movement of said turnable member and plug in plug-withdrawing direction.

4. In a shut-off valve assembly having a valve plug axially withdrawable from a valve casing, said valve casing having a side wall concentric with said plug and formed with an inlet and an outlet; a normally non-rotatable valve sleeve interposed between said plug and said side wall, said valve sleeve having ports normally registering with said inlet and outlet respectively and controlled by said valve plug, cooperating means carried by said valve plug, said cooperating means being directly engageable and cooperable with said valve sleeve for closing said valve sleeve ports upon rotation of said valve plug relative to said valve sleeve, means for holding said valve sleeve against axial shifting, means whereby said valve sleeve may be turned to close said inlet and outlet prior to withdrawal of said valve plug, a turnable member releasably engaged with said casing for normally holding said plug against withdrawal, said turnable member being disposed entirely above said plug and being turnable about an axis aligned with the axis of said plug to a predetermined position in which it is freed from engagement with said casing to permit plug withdrawal, said turnable member constituting an actuator for said valve-sleeve-turning means, said valve-sleeve-turning means having a separable connection with said valve sleeve to disengage said turning means from said valve sleeve during plug withdrawal, said plug, said turnable member and said valve-sleeve-turning means being connected for unitary movement in plug-withdrawing direction, and cooperable ramp-and-lug means on said turnable member and casing, said ramp-and-lug means being cooperable to shift said turnable member in said plug-withdrawing direction upon turning of said turnable member from the aforesaid position, after initially shifting said turnable member in said direction to disengage said valve-sleeve-turning means from said valve sleeve.

5. A structure as specified in claim 3, in which said plug, said turnable member and said valve-sleeve-turning element are connected for unitary movement in plug-withdrawing direction, and cooperable ramp-and-lug means on said turnable member and casing, said ramp-and-lug means being cooperable to shift said turnable member in said plug-withdrawing direction upon turning of said turnable member from the aforesaid predetermined position, after initially shifting said turnable member in said direction to disengage said valve-sleeve-turning element from said valve sleeve.

6. In a valve assembly having a valve plug axially withdrawable from a cup-like casing; a turnable member in the open end of said casing and normally holding said valve plug against withdrawal, said turnable member being turnable about an axis aligned with the plug axis and being provided with projecting peripheral lugs, the side wall of said casing having spaced arcuate circumferentially extending ribs on its inner side and abutting the outer sides of said lugs respectively, said lugs and ribs cooperating in holding said turnable member in the casing until said turnable member is turned to a predetermined postion in which said lugs may pass between the spaced ends of said ribs, and a releasable latch mounted on said turnable member and normally abutting spaced ends of said ribs to hold said turnable member against accidental turning.

7. A shut-off valve assembly comprising a cup-like casing having an open end and a substantially cylindrical side wall formed with an inlet and an outlet, said side wall having an outwardly offset continuous portion at the open end of said casing, a normally non-rotatable sleeve disposed at the inner peripheral side of said side wall and located inwardly of said offset wall portion, said sleeve having an inlet port normally registering with said casing inlet and also having an outlet port normally registering with said casing outlet, a turnable plug within said sleeve and having a passage for communication with said inlet and outlet ports of said sleeve when said plug is turned to one position, said plug being turnable to a second position in which it closes said inlet and outlet ports of said sleeve, a closure plate inserted into the open end of said casing and disposed inwardly of said outwardly offset portion of the casing side wall, said closure plate having a central opening, a turnable abutment plate abutting the outer side of said closure plate and having lugs projecting toward said offset wall portion, said wall portion being provided with spaced arcuate circumferentially extending ribs abutting the outer sides of said lugs and prohibiting movement of said abutment plate toward said open end of said casing until said abutment plate is turned to a predetermined position to permit passage of said lugs through the spaces between said ribs, said abutment plate being provided with a sleeve-like hub projecting turnably through said central opening of said closure plate, a sleeve-turning member secured to the inner end of said hub and disposed between said closure plate and the aforesaid plug and sleeve, said sleeve-turning member having a separable connection with the adjacent end of said sleeve to cause turning of this sleeve to a position in which it closes the aforesaid casing inlet and outlet when said abutment plate is turned to the aforesaid predetermined position, a plug-operating shaft extending turnably through the aforesaid hub, said shaft being connected with said plug and said abutment plate and acting to tie said abutment plate, said closure plate, said sleeve-turning member and said plug together for withdrawal as a unit from the casing, means for holding the aforesaid sleeve against withdrawal movement with said unit, the aforesaid separable connection being separable upon initial withdrawal movement of said unit, leaving said sleeve in the casing in the position in which said sleeve closes said casing inlet and outlet, sealing means between the relatively movable elements of the assembly, and releasable means normally holding said abutment plate against turning.

8. A structure as specified in claim 7 in which said separable connection comprises a notch in said adjacent end of said sleeve and open toward the open end of said casing, and an element on said sleeve-turning member removably received in said notch.

9. A structure as specified in claim 7 in which said separable connection comprises a notch in said adjacent end of said sleeve and open toward the open end of said casing, and an element on said sleeve-turning member removably received in said notch; and a spring-pressed detent carried by said casing side wall in position to enter said notch when said element of said sleeve-turning member leaves said notch.

10. A structure as specified in claim 7 in which said separable connection comprises a notch in said adjacent end of said sleeve and open toward the open end of said casing, and an element on said sleeve-turning member removably received in said notch; and a spring-pressed detent carried by said casing side wall in position to enter said notch when said element of said sleeve-turning member leaves said notch, said element being beveled to force said detent from said notch when the aforesaid unit is re-inserted into the casing.

11. A structure as specified in claim 7, in which said arcuate ribs are provided with ramps cooperable with said lugs to aid in withdrawal of said unit from the casing, said lugs being engageable with said ramps upon turning said unit after imparting said initial withdrawal movement to said unit.

12. A structure as specified in claim 7; together with a driving motor for said plug-operating shaft, said motor being secured to said abutment plate and constituting a hand grip for use in turning said abutment plate.

13. In a shut-off valve assembly having a valve plug axially withdrawable from a valve casing, said valve casing having a side wall concentric with said plug and formed with an inlet and an outlet; a normally non-rotatable valve sleeve interposed between said plug and said side wall, said valve sleeve having ports normally registering with said inlet and outlet respectively and controlled by said valve plug, cooperating means carried by said valve plug, said cooperating means being directly engageable and cooperable with said valve sleeve for closing said valve sleeve ports upon rotation of said valve plug relative to said valve sleeve, means for holding said valve sleeve against axial shifting, means whereby said valve sleeve may be turned to close said inlet and outlet prior to withdrawal of said valve plug, said cooperating means including a pair of sealing units on said plug and in sealing contact with said sleeve, said sealing units being positioned to surround said ports respectively when said plug occupies a closed position, said sealing units being so constructed and arranged that when said plug occupies a closed position the upstream sealing unit will yield from sealing contact with said sleeve under the influence of excessively high fluid pressure at the upstream side of the plug and sleeve assembly, and the downstream sealing unit will likewise yield under the influence of excessively high fluid pressure at the downstream side of the plug and sleeve assembly, and pressure relief means embodied in the valve and arranged to relieve the excessively high fluid pressure released by said yielding.

14. In a shut-off valve assembly having a valve plug axially withdrawable from a valve casing, said valve casing having a side wall concentric with said plug and formed with an inlet and an outlet; a normally non-rotatable valve sleeve interposed between said plug and said side wall, said valve sleeve having ports normally registering with said inlet and outlet respectively and controlled by said valve plug, cooperating means on said valve sleeve and said valve plug for closing said valve sleeve ports upon rotation of said valve plug relative to said valve sleeve, means for holding said valve sleeve against axial shifting, means whereby said valve sleeve may be turned to close said inlet and outlet prior to withdrawal of said valve plug, said cooperating means including a pair of sealing units on said plug and in sealing contact with said sleeve, said sealing units being positioned to surround said ports respectively when said plug occupies a closed position, said sealing units being so constructed and arranged that when said plug occupies a closed position, the upstream sealing unit will yield from sealing contact with said sleeve under the influence of excessively high fluid pressure at the upstream side of the plug and sleeve assembly, and the downstream sealing unit will likewise yield under the influence of excessively high fluid pressure at the downstream side of the plug and sleeve assembly, and pressure relief means embodied in the valve and arranged to relieve the excessively high fluid pressure released by said yielding.

References Cited by the Examiner

UNITED STATES PATENTS

| | | | |
|---|---|---|---|
| 719,528 | 2/03 | Stevens | 137—637.5 |
| 851,338 | 4/07 | Barnhouse | 251—104 |
| 1,841,050 | 1/32 | O'Stroske | 137—635.5 |
| 2,186,481 | 1/40 | Fleming | 137—315 |
| 2,230,434 | 2/41 | Porter | 137—315 |
| 2,545,834 | 3/51 | Westbrook | 251—312 |
| 2,628,809 | 2/53 | Mikeska | 251—317 |
| 2,728,551 | 12/55 | Blackman | 251—317 |
| 2,844,353 | 7/58 | Gurries | 251—175 |
| 2,997,057 | 8/61 | Toth | 137—315 |

FOREIGN PATENTS 691,430   1953   Great Britain.

ISADOR WEIL, *Primary Examiner.*